(12) United States Patent
Chen et al.

(10) Patent No.: US 11,344,824 B2
(45) Date of Patent: May 31, 2022

(54) ULTRASONIC MICROBUBBLE GENERATION METHOD, APPARATUS AND SYSTEM

(71) Applicant: PetroChina Company Limited, Beijing (CN)

(72) Inventors: Xinglong Chen, Beijing (CN); Hongwei Yu, Beijing (CN); Shi Li, Beijing (CN); Haishui Han, Beijing (CN); Zemin Ji, Beijing (CN)

(73) Assignee: PetroChina Company Limited, Beijing (CN)

( * ) Notice: Subject to any disclaimer, the term of this patent is extended or adjusted under 35 U.S.C. 154(b) by 406 days.

(21) Appl. No.: 16/546,588

(22) Filed: Aug. 21, 2019

(65) Prior Publication Data

US 2020/0070067 A1    Mar. 5, 2020

(30) Foreign Application Priority Data

Sep. 5, 2018 (CN) .......................... 201811030849.8

(51) Int. Cl.
*B01D 21/28* (2006.01)
*B01D 21/34* (2006.01)
(Continued)

(52) U.S. Cl.
CPC .............. *B01D 21/28* (2013.01); *B01D 21/34* (2013.01); *E21B 43/122* (2013.01);
(Continued)

(58) Field of Classification Search
CPC ....... B01D 21/28; B01D 21/34; E21B 43/122; E21B 43/128; E21B 43/129;
(Continued)

(56) References Cited

U.S. PATENT DOCUMENTS 4,763,677 A * 8/1988 Miller ..................... B08B 3/123
134/1
5,059,331 A * 10/1991 Goyal ..................... B01D 29/66
210/785
(Continued)

FOREIGN PATENT DOCUMENTS

CN        2297256 Y     11/1998
CN        2299197 Y     12/1998
(Continued)

OTHER PUBLICATIONS

Liu Zengliang et al, Beijing University of Posts and Telecommunications Press, New College Physics Experiment, p. 117-p. 118 (2016).

(Continued)

*Primary Examiner* — Bradley R Spies
*Assistant Examiner* — Jeannie McDermott
(74) *Attorney, Agent, or Firm* — Hamilton, Brook, Smith & Reynolds, P.C.

(57) ABSTRACT

The embodiments of the present disclosure disclose an ultrasonic microbubble generation method, apparatus and system. The apparatus comprises a horn-shaped conductor including an upper horn-shaped body and a lower cylindrical body; the horn-shaped body is provided with a cavity having an upper opening, an upper end of the cavity is fixedly connected with a micropore vibration thin sheet, a micropore array of the micropore vibration thin sheet is corresponding to the upper opening of the cavity, and a side wall of the cavity is provided with a through hole for external gas to enter the cavity; the cylindrical body is provided with a transducing ring and an electrode sheet, an outer side of the cylindrical body is insulated and sealed, and a connection wire of the electrode sheet is led out by a steel (Continued)

pipe and connected with an external ultrasonic oscillation controller.

13 Claims, 6 Drawing Sheets

(51) Int. Cl.
    *E21B 43/12*     (2006.01)
    *E21B 43/38*     (2006.01)
    *E21B 43/16*     (2006.01)

(52) U.S. Cl.
    CPC .......... *E21B 43/128* (2013.01); *E21B 43/129* (2013.01); *E21B 43/168* (2013.01); *E21B 43/38* (2013.01)

(58) Field of Classification Search
    CPC ........ E21B 43/168; E21B 43/38; E21B 43/20; B06B 1/0651; B01F 3/0426; B01F 11/0258; B01F 3/04978; B01F 11/0291; B01F 2003/04858; B01F 2215/0083; B01J 3/002; B01J 3/02; B01J 3/04
    See application file for complete search history.

(56) References Cited

U.S. PATENT DOCUMENTS

| | | | |
|---|---|---|---|
| 7,232,524 B2 | 6/2007 | Arnaud et al. | |
| 2009/0066192 A1* | 3/2009 | Taki | G10K 11/004 310/354 |
| 2011/0017334 A1* | 1/2011 | Peter | B21C 23/14 138/103 |
| 2015/0343399 A1* | 12/2015 | Kim | C10L 1/328 435/408 |
| 2017/0252778 A1* | 9/2017 | Kojima | H01L 41/25 |

FOREIGN PATENT DOCUMENTS

| | | | |
|---|---|---|---|
| CN | 2491668 Y | | 5/2002 |
| CN | 2648209 Y | | 10/2004 |
| CN | 101832423 A | | 9/2010 |
| CN | 104888636 A | | 9/2015 |
| CN | 104968607 A | | 10/2015 |
| CN | 105148819 A | | 12/2015 |
| CN | 105598023 A | | 5/2016 |
| CN | 105148760 B | | 7/2017 |
| CN | 105148819 B | * | 7/2017 |
| CN | 105148819 B | | 7/2017 |
| JP | 2007253000 A | | 10/2007 |
| WO | 2016018504 A1 | | 2/2016 |

OTHER PUBLICATIONS

Chinese Search Report with English Translation issued in counterpart Chinese Patent Application No. 201811030849.8, dated Mar. 19, 2020.
First Office Action and search report dated Jan. 6, 2020 for counterpart Chinese patent application No. 201811030849.8, entitled, "Ultrasonic microbubble generation method, device and system," along with machine EN translation downloaded from EPO.
"Progresses in Research and Application of Micro-Nano Bubble Generating Device", Petrochemical Technology, vol. 43, No. 10, pp. 1206-1211, 2014.
Chinese Search Report for Chinese Patent Application No. 201811030849.8, titled Ultrasonic Microbubble Generation Method, Apparatus and System, dated Aug. 8, 2018 (with English translation).
Chinese Search Report for Application No. 201811030849.8, entitled entitled "Ultrasonic Microbubble Generation Method, Apparatus and System," dated Sep. 28, 2020.

* cited by examiner

ULTRASONIC MICROBUBBLE GENERATION METHOD, APPARATUS AND SYSTEM

RELATED APPLICATION(S)

This application claims priority under 35 U.S.C. § 119 or 365 to Chinese Application No. 201811030849.8, filed Sep. 5, 2018, which is hereby incorporated by reference in its entirety.

TECHNICAL FIELD

The present disclosure relates to the technical field of oil and gas exploration and development, and in particular, to an ultrasonic microbubble generation method, apparatus and system.

BACKGROUND

At present, the microbubble generation technology is gradually rising in the fields of greenhouse gas environmental protection and oil displacement technological development. In the field of oil development, the whole formed by dispersing micron-sized bubbles in the water phase is called as a water-gas dispersion system. During oil displacement, tiny bubbles can enter pores that the injected water is difficult to enter, thus improving the sweep efficiency and the recovery percent of reserves. The micron-sized bubbles are easy to expand in the large pores, and play a role of profile control for plugging the large pore channels and turning the liquid. The oil displacement by a water-gas dispersion system is an effective substitute way to continuously improve the recovery percent in the later stage of the water injection development.

At present, the microbubble generation method is mainly includes the orifice plate method, i.e., a way in which gas forms microbubbles through tiny pores. The dense metal filter sheet is also an extension of this method. Currently, the diameter of the bubbles generated by this method is mostly 30 to 200 microns. In order to obtain microbubbles with a smaller diameter, the diameter of the generated bubbles can be controlled by further adopting an ultrasonic oscillation method, which can reach a range of 1 to 50 microns. However, this technology is still in the research and development stage in the laboratory, and its gas production capacity is far from meeting the requirements of industrial application. Therefore, a more effective microbubble generation method is urgently needed in the technical field.

SUMMARY

An objective of the embodiment of the present disclosure is to provide an ultrasonic microbubble generation method, apparatus and system, which can greatly improve the amount of the generated microbubbles and is safer and more efficient.

The ultrasonic microbubble generation method, apparatus and system provided by the present disclosure are implemented as follows:

An ultrasonic microbubble generation apparatus, comprising a horn-shaped conductor including an upper horn-shaped body and a lower cylindrical body;

the horn-shaped body is provided with a cavity having an upper opening, an upper end of the cavity is fixedly connected with a micropore vibration thin sheet, a micropore array of the micropore vibration thin sheet is corresponding to the upper opening of the cavity, and a side wall of the cavity is provided with a through hole for external gas to enter the cavity;

the cylindrical body is provided with a transducing ring and an electrode sheet, an outer side of the cylindrical body is insulated and sealed, and a connection wire of the electrode sheet is led out by a steel pipe and connected with an external ultrasonic oscillation controller.

In another embodiment of the apparatus provided by the present disclosure, the cavity is further provided therein with a blocking cover sheet having a size larger than or equal to that of the upper opening of the cavity.

In another embodiment of the apparatus provided by the present disclosure, one end of the blocking cover sheet and an inner wall of the cavity are connected by a hinge.

In another embodiment of the apparatus provided by the present disclosure, sealing rings are further provided on the inner walls of both sides of the cavity near the upper opening, to improve a sealing performance of the blocking cover sheet to the upper opening.

In another embodiment of the apparatus provided by the present disclosure, the horn-shaped body is of an integrally formed structure.

In another embodiment of the apparatus provided by the present disclosure, the horn-shaped body comprises an upper end cover, which is a hollow annular structure, and the micropore vibration thin sheet is fixedly connected with an upper end of the upper end cover.

In another embodiment of the apparatus provided by the present disclosure, the transducing ring has a thickness range from 3 mm to 8 mm.

In another embodiment of the apparatus provided by the present disclosure, the horn-shaped body is provided therein with a pipeline communicated with the through hole on the cavity to delivery external gas into the cavity.

In another embodiment of the apparatus provided by the present disclosure, the pipeline is symmetrically provided on two sides of the horn-shaped body.

In another aspect, an embodiment of the present disclosure further provides an ultrasonic microbubble generation method based on the ultrasonic microbubble generation apparatus according to any one of the above embodiments, comprising:

delivering gas with a preset pressure into a cavity of the ultrasonic microbubble generation apparatus, the gas in the cavity passing through a micropore array of a micropore vibration thin sheet under an action of the pressure to form bubbles;

connecting an electrode sheet of the ultrasonic microbubble generation apparatus with an ultrasonic oscillation controller through a connection wire led out by a steel pipe, to control oscillation of a transducing ring of the ultrasonic microbubble generation apparatus;

driving, by the oscillation of the transducing ring, the micropore vibration thin sheet of the ultrasonic microbubble generation apparatus to oscillate, to scatter bubbles passing through the micropore vibration thin sheet to obtain micron-sized bubbles.

In another aspect, an embodiment of the present disclosure further provides an ultrasonic microbubble generation system, comprising the ultrasonic microbubble generation apparatus according to any one of the above embodiments, an autoclave, an ultrasonic oscillation controller, a piston container, a first water injection pump, and a second water injection pump;

the first water injection pump is connected with the autoclave to fully inject water into the autoclave;

the ultrasonic microbubble generation apparatus is provided in the autoclave;

the ultrasonic oscillation controller is connected with an electrode sheet of the ultrasonic microbubble generation apparatus through a connection wire, to control an oscillation of a transducing ring;

the second water injection pump is connected with the piston container to inject water thereinto;

gas with a certain pressure is preset in the piston container, the piston container injects the gas with a preset pressure into the cavity of the ultrasonic microbubble generation apparatus through a gas delivery pipe, under a water injection pressure of the second water injection pump.

In another embodiment of the system provided by the present disclosure, the system further comprises a gas pressure control valve provided on the gas delivery pipe to control a pressure of the gas delivered into the ultrasonic microbubble generation apparatus.

In another aspect, an embodiment of the present disclosure further provides an ultrasonic microbubble generation method based on the ultrasonic microbubble generation system according to any one of the above embodiments, comprising:

providing a ultrasonic microbubble generation apparatus in an autoclave, sealing the autoclave, and fully injecting water into the autoclave by a first water injection pump;

presetting gas with a certain pressure in a piston container, injecting water into the piston container by a second water injection pump, injecting gas with a preset pressure into a cavity of the ultrasonic microbubble generation apparatus by the piston container through a gas delivery pipe under a water injection pressure of the second water injection pump, and enabling the gas in the cavity to pass through a micropore vibration thin sheet of the ultrasonic microbubble generation apparatus under an action of pressure to form bubbles in water in the autoclave;

controlling, by an ultrasonic oscillation controller, an oscillation of the ultrasonic microbubble generation apparatus through a connection wire, to scatter bubbles passing through the micropore vibration thin sheet to form micron-sized bubbles in water in the autoclave.

One or more embodiments of the present disclosure provide an ultrasonic microbubble generation method, apparatus and system. The microbubble generation apparatus may be designed as a structure of a horn-shaped conductor. Correspondingly, the apparatus may comprise an upper horn-shaped body and a lower cylindrical body. The cylindrical body is provided with a transducing ring with a thickness no longer limited by the structure of the vibration sheet to be driven. An integral sealing design can be made for the cylindrical body to achieve a high-power ultrasonic vibration while ensuring a safe operation of the apparatus. Meanwhile, a structure of a cavity is provided on the horn-shaped body, a micropore vibration thin sheet is fixed at an upper end of the cavity, and gas in the cavity can form bubbles through vent holes under an action of the pressure. In addition, a high-frequency oscillation of the micropore vibration thin sheet can be driven by the transducing ring to scatter bubbles passing through the micropore vibration thin sheet to form micron-sized bubbles. Therefore, by using various embodiments of the present disclosure, the amount of the generated microbubbles can be increased more safely and efficiently.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

In order that those skilled in the art better understand the technical solutions in the present disclosure, the technical solutions in one or more embodiments of the present disclosure will be clearly and completely described as follows with reference to the drawings for the one or more embodiments of the present disclosure. Obviously, those described are just a part rather than all of the embodiments of the present disclosure. Based on the one or more embodiments of the present disclosure, any other embodiment obtained by those skilled in the art without paying any creative effort should fall within the protection scope of the solutions in the embodiments of the present disclosure.

Figure 1:
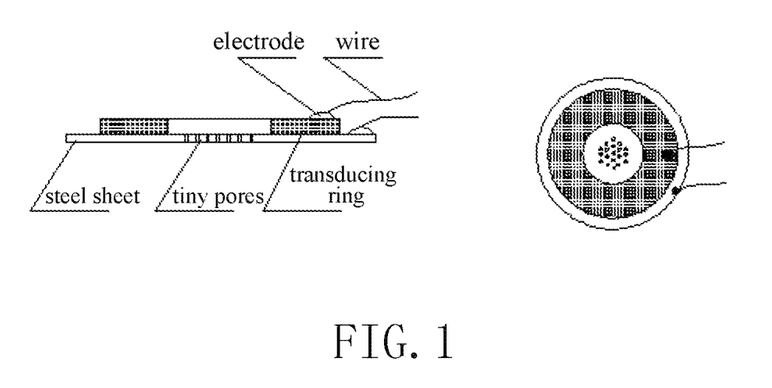
FIG. 1 is a schematic structural diagram of a vibration sheet for generating microbubbles, provided in the present disclosure.

FIG. 1 illustrates a vibration sheet for an existing bubble generation method, wherein a left drawing of FIG. 1 is a side view of the vibration sheet, and a right drawing of FIG. 1 is a top view of the vibration sheet. As illustrated in FIG. 1, the vibration sheet for the existing bubble generation method is formed by bonding a ring-shaped transducing plate to a steel plate, with a center of the steel plate provided with a micropore array of 5 to 10 microns for gas to pass through to generate bubbles. The transducing ring is connected with an electrode sheet, and the electrode sheet is connected with an external ultrasonic control circuit through a wire to control an oscillation of the transducing plate through the ultrasonic control circuit, thereby driving the vibration sheet to perform a high-frequency oscillation.

Figure 2:
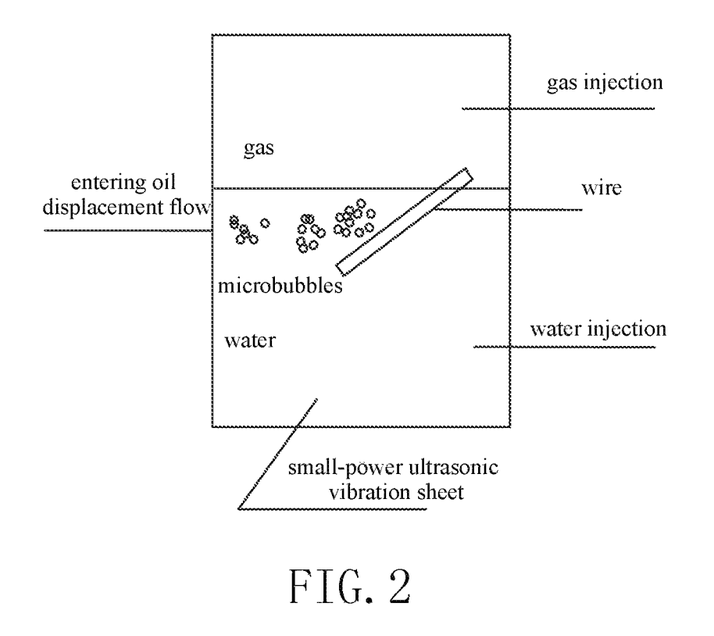
FIG. 2 is a schematic structural diagram of microbubbles are generated by using a vibration sheet, provided in the present disclosure.

FIG. 2 illustrates a schematic structural diagram of the microbubbles are generated by using the above apparatus. As can be seen from FIG. 2, the vibration sheet needs to be placed at an interface between a water phase and a gas phase during implementation. An abnormal pressure region is formed in a certain space of the vibration sheet through a high-frequency continuous oscillation of the ring-shaped transducing plate, and upper and lower ends of the steel plate in the region present a reciprocating alternation of high and low pressures, which destroys the gas-liquid interface.

Bubbles passing through the pores are scattered into a plurality of tiny bubbles by the elastic energy, thus forming micron-sized bubbles.

In actual use, the electrode on the vibration sheet is prone to short-circuit. When the power of the vibration sheet is small (e.g., 2 W, with a corresponding voltage of 5V), the short circuit phenomenon only increases the heating degree of the vibration sheet and the circuit board, without cause a power failure, but the volume of the bubbles generated is also small. However, if the power is further increased, problems such as power failure or circuit board damage may occur. In addition, the micropore array of the vibration sheet need to be accurately placed at the interface between the water phase and the gas phase, which causes complexity of the operation and affects the use in the industrial environment.

In view of this, the embodiment of the present disclosure provides an ultrasonic microbubble generation apparatus, which may comprise a horn-shaped conductor that may comprise an upper horn-shaped body and a lower cylindrical body. The horn-shaped body is provided with a cavity having an upper opening, an upper end of the cavity is fixedly connected with a micropore vibration thin sheet, and a micropore array of the micropore vibration thin sheet is corresponding to the upper opening of the cavity. A side wall of the cavity is provided with a through hole for external gas to enter the cavity. The cylindrical body is provided with a transducing ring and an electrode sheet, an outer side of the cylindrical body is insulated and sealed, and a connection wire of the electrode sheet is led out by a steel pipe and connected with the external ultrasonic oscillation controller.

During implementation, the ultrasonic microbubble generation apparatus may be placed in water, and then gas with a preset pressure is input into the cavity, so that the gas enters the water through a vent hole of the micropore vibration thin sheet under an action of the pressure. Meanwhile, a voltage may be applied to the electrode sheet through the ultrasonic oscillation controller to control an oscillation of the transducing ring, and the oscillation energy of the transducing ring is effectively transmitted to the micropore vibration thin sheet through the horn-shaped conductor, thereby driving the micropore vibration thin sheet to perform a high-frequency oscillation. Bubbles passing through the vent hole of the micropore vibration thin sheet are scattered into a plurality of tiny bubbles by the elastic energy under the influence of the reciprocating alternation of high and low pressures caused by the high-frequency continuous oscillation of the micropore vibration thin sheet, thereby forming micron-sized bubbles.

According to the apparatus of the embodiment of the present disclosure, the transducing ring and the electrode sheet are provided on the cylindrical body, and the outer side of the cylindrical body is insulated and sealed, so that the transducing ring and the electrode sheet are sealed. Next, the electrode line is led out by the steel pipe, which can improve the waterproof performance of the whole apparatus. The short circuit phenomenon will not occur even when the ultrasonic microbubble generation apparatus is wholly placed in water, thus greatly ensuring the usability and safety of the apparatus. Meanwhile, a thickness of the transducing ring is not limited by the structure of the vibration sheet to be driven, so that a high-power ultrasonic vibration can be realized, and the amount of the generated microbubbles can be greatly improved.

In addition, the apparatus is designed into the structure of a horn-shaped conductor which has a good characteristic of energy transmission, and the micropore vibration thin sheet is fixed on an upper end surface of the horn-shaped conductor, so that the oscillation energy of the transducing ring can be effectively transmitted to the micropore vibration thin sheet, and the oscillation energy is concentrated in a center of the vibration sheet.

Meanwhile, a cavity is designed at the horn mouth, and an upper end of the cavity is fixedly connected with the micropore vibration thin sheet, so that the gas can pass through a bottom of the vibration sheet under an action of the pressure and enter the water through the vent hole. The sealing effect and the water-isolation effect of the gas can be further ensured by using the structure. In addition, with the above structure, even if the mounting position of the micropore vibration thin sheet is slightly deviated, the effective passage of the gas is not affected, thus further reducing the structural design complexity.

Figure 3:
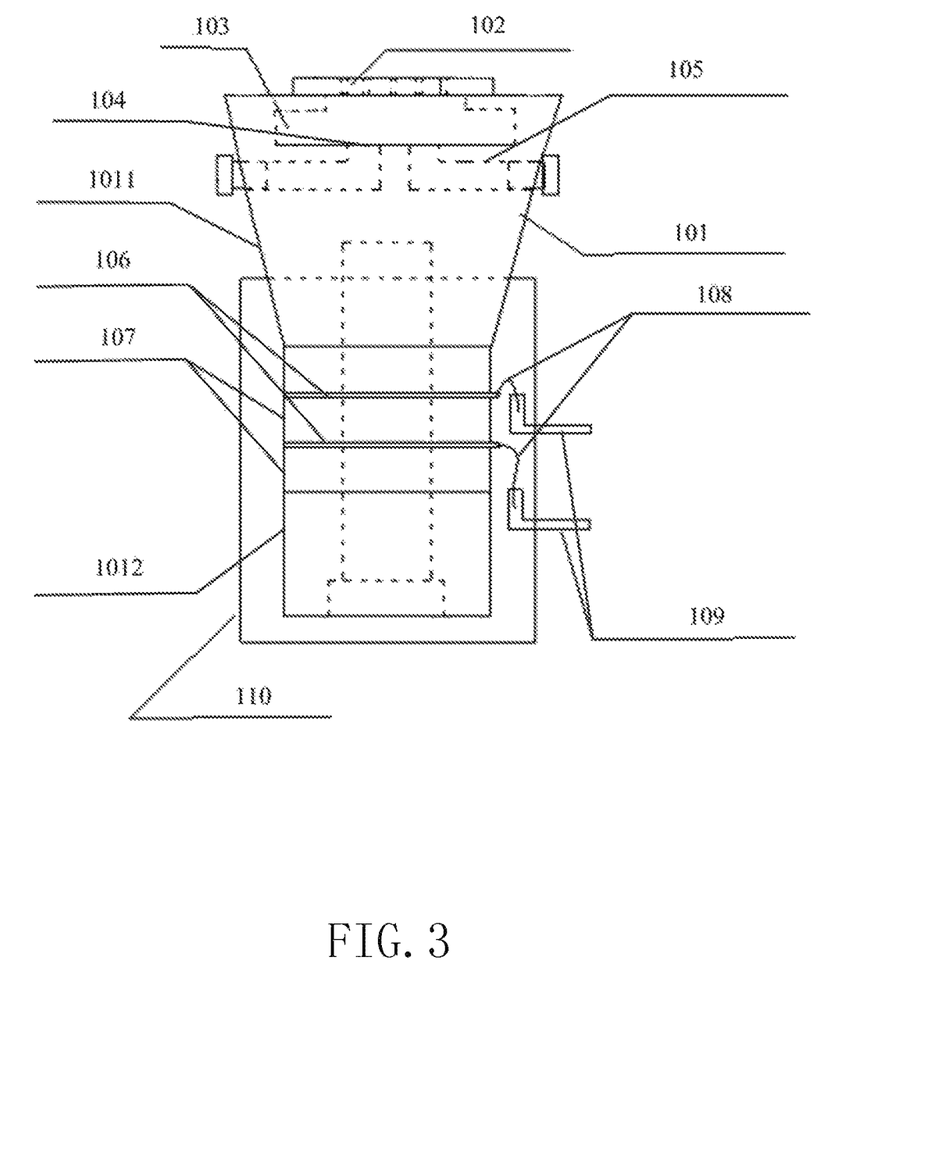
FIG. 3 is a schematic structural diagram of an ultrasonic microbubble generation apparatus, provided in the present disclosure.

FIG. 3 is a schematic structural diagram of an ultrasonic microbubble generation apparatus provided in one embodiment of the present disclosure. As illustrated in FIG. 3, the apparatus may comprise a horn-shaped conductor 101, which may comprise an upper horn-shaped body 1011 and a lower cylindrical body 1012.

An upper portion of the horn-shaped body 1011 may be provided with a cavity 103, an upper end of the cavity 103 is fixedly connected with a micropore vibration thin sheet 102, and a micropore array is distributed in a center of the micropore vibration thin sheet 102. The micropore array may comprise a plurality of vent holes of 5 to 10 μm for gas to pass through to generate bubbles. During implementation, the micropore vibration thin sheet 102 may be bonded or welded to an end surface of the horn-shaped body, with an edge portion thereof being in close contact with the end surface, and the micropore array in the center of the micropore vibration thin sheet 102 is corresponding to the cavity 103.

By designing the cavity at the horn mouth, the upper end of the cavity is fixedly connected to the micropore vibration thin sheet, and the gas can pass through the bottom of the vibration sheet under an action of the pressure to form bubbles, thereby ensuring the sealing effect and the water-isolation effect of the gas. Moreover, even if the mounting position of the micropore vibration thin sheet is slightly deviated, the effective passage of the gas is not affected, thus further reducing the structural design complexity.

In one or more embodiments of the present disclosure, the horn-shaped body may be an integrally formed structure, and the cavity is formed at the upper portion of the horn-shaped body. The integrally formed structure can improve the sealing property of the cavity and further ensure the sealing effect and the water-isolation effect of the gas.

Figure 4:
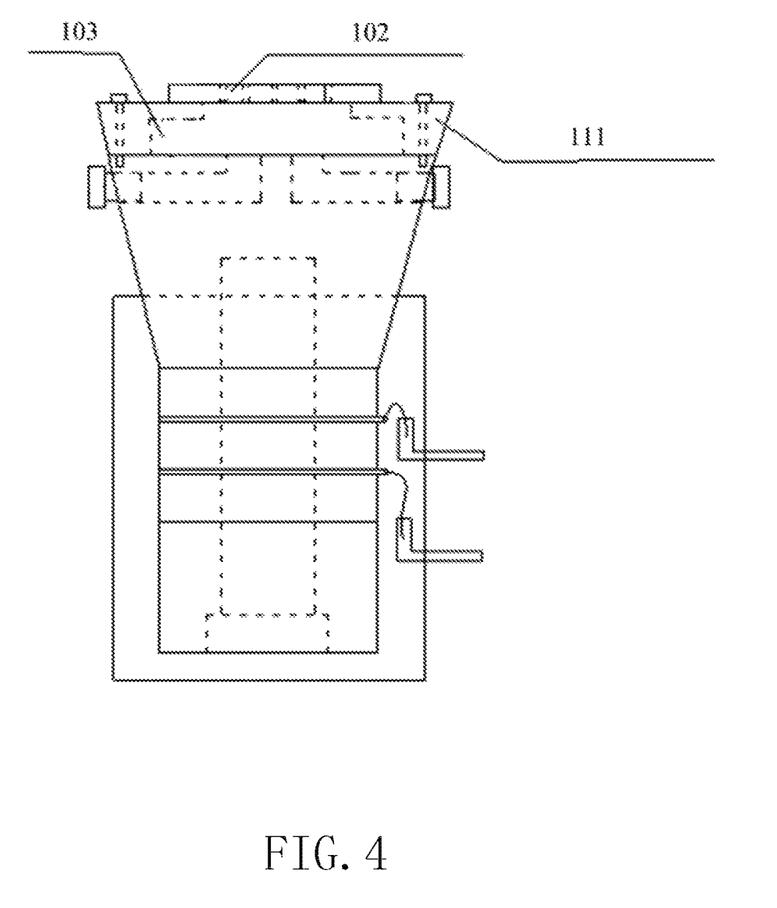
FIG. 4 is a schematic structural diagram of another ultrasonic microbubble generation apparatus, provided in the present disclosure.
Figure 5:
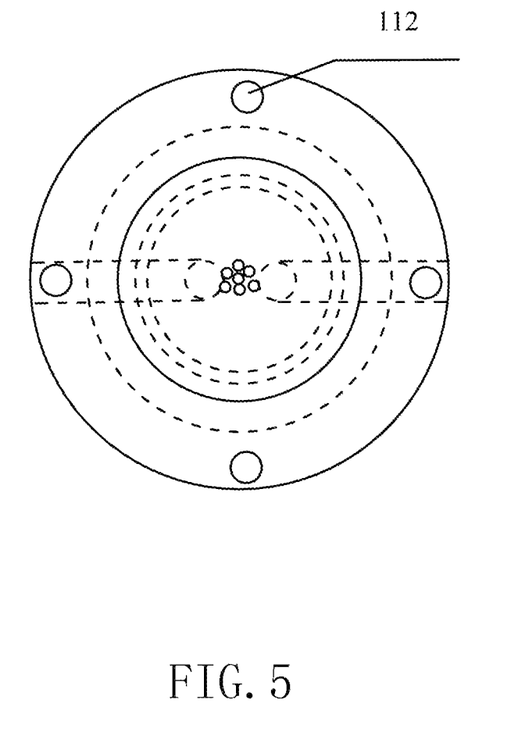
FIG. 5 is a top view of another ultrasonic microbubble generation apparatus, provided in the present disclosure.

FIG. 4 is a schematic structural diagram of another ultrasonic microbubble generation apparatus in the present disclosure, and FIG. 5 is a top view of the structure illustrated in FIG. 4. As illustrated in FIGS. 4 and 5, the horn-shaped body may also be provided as a two-section structure. The upper end of the horn-shaped body may be provided with an upper end cover 111, which is a hollow annular structure and may be fixed on a lower half of the horn-shaped body by bolts 112 and the like, thereby forming a cavity structure at the upper end of the horn-shaped body. By forming the hollow structure by adopting the fixed and detachable hollow upper end cover, the whole design of the apparatus can be simpler. Correspondingly, the micropore vibration thin sheet 102 may be fixed at the upper end of the upper end cover, and the micropore array in the center of the micropore vibration thin sheet 102 is corresponding to the cavity 103.

As illustrated in FIG. 3, a side wall of the cavity 103 may also be provided with a through hole 104 for external gas to enter the cavity. During implementation, the external gas with a preset pressure may be delivered into the cavity through the through hole 104, and under an action of the pressure, the gas in the cavity moves upward to pass through the micropore vibration thin sheet 102 to form bubbles.

During implementation, the through hole may be formed on the side wall of the cavity and communicated with the external, and a delivery pipe for the external gas may be connected with the through hole through a screwed connection and the like. Preferably, in one embodiment of the present disclosure, a pipeline 105 for external gas to flow into the cavity may be provided on the horn-shaped body at a lower portion of the cavity, and communicated with the through hole 104 in the cavity. By providing the pipeline communicated with the through hole on the horn-shaped body, the position of the through hole can be more conveniently arranged. For example, the through hole may be provided at a lower end of the cavity, thereby reducing the influence of left and right airflows generated by the gas entering the cavity on the bubble generation. Then, the through hole is communicated with the delivery pipe for the external gas through the pipeline 105.

The through hole may be provided as plural, and correspondingly, the pipeline may also be provided as plural. As illustrated in FIG. 3, in one embodiment of the present disclosure, the pipeline can be symmetrically provided on the left and right sides of the horn-shaped body. When the gas enters the cavity through the pipeline on one side and the pipeline on the other side is blocked, the gas flows out along the micropore array of the micropore vibration thin sheet. When the pressure of the gas flowing into the cavity is abnormal, the pipeline on the other side may also be opened to release the gas conveniently. Meanwhile, the provision of the pipeline on both sides is also convenient for mounting the apparatus.

The cylindrical body 1012 is provided with an electrode sheet 106 and a transducing ring 107. The electrode sheet 106 may be connected with the external ultrasonic oscillation controller through the connection wire 108, and the ultrasonic oscillation controller applies a voltage to the electrode sheet to control an oscillation of the transducing ring. In some embodiments, a material of the transducing ring may be piezoelectric ceramic or the like, and the electrode sheet may be made of a metal material with good conductivity such as copper sheet or aluminum sheet.

During implementation, there may be one or more electrode sheets and transducing rings, which together form a transducer of the ultrasonic microbubble generation apparatus for converting electrical energy into mechanical energy. A lower end of the transducer for example may be provided with a fixing block, and then the electrode sheet and the transducing ring are fixed by fixing screws. Of course, the transducer may also be fixed in other ways during implementation, which is not limited herein. With the above structural design, the thickness of the transducing ring can be set based on actual needs, and is no longer limited by the structure of the micropore vibration thin sheet to be driven, thus realizing a high-power ultrasonic vibration.

Preferably, in one embodiment of the present disclosure, the thickness of the transducing ring may be set to any value between 3 mm and 8 mm, and corresponding vibration frequency may be between 100 KHz and 300 KHz, so that the high-pressure resistance of the apparatus can be improved while satisfying the working frequency. The correspondingly matched control circuit may meet the requirements that the input voltage is 220V of alternating voltage and the output voltage is 24V of direct voltage. The working power of a single apparatus can reach more than 60 W, and a plurality of apparatuses can operate in parallel, thus greatly improving the gas output quantity of the apparatus.

The outer side of the cylindrical body 1012 may be insulated and sealed, and after sealing, the connection wire 108 of the electrode sheet may be led out by the steel pipe 109. With the above sealed structure design, even if the whole apparatus is immersed in water, a short circuit will not occur. In some embodiments, for example, a rigid sealant 110 may be used to encapsulate the outer side of the cylindrical body, so as to seal the transducing ring and the electrode sheet. By providing the structure of the transducing ring on the cylindrical body and sealing the transducing ring with the rigid sealant, the vibration effect of the transducing ring can be effectively ensured while improving the waterproof performance of the apparatus. Meanwhile, the adaptability of the whole apparatus to the external air pressure can be further increased. For example, the external pressure difference borne by the whole apparatus can reach more than 20 MPa, and correspondingly, the use well depth of the apparatus can be increased to more than 2000 m, thus greatly improving the adaptability of the whole apparatus to the complex downhole environments in actual industrial applications.

During implementation, the whole apparatus may be immersed in water, and a voltage is applied to the electrode sheet 106 through the external ultrasonic oscillation controller, thereby controlling an oscillation of the transducing ring, and the oscillation energy of the transducing ring is transmitted to the micropore vibration thin sheet 102 along the horn-shaped conductor, thereby driving the micropore vibration thin sheet 102 to perform a high-frequency oscillation. With the horn-shaped structure design, the vibration energy can be concentrated in the center of the micropore vibration thin sheet.

Meanwhile, the external gas with a preset pressure may be delivered into the cavity 103 through a pipeline 105 in screwed connection with the delivery pipe for the external gas.

The micropore vibration thin sheet 102 performs a high-frequency continuous oscillation to form an abnormal pressure region in a certain space above and below the micropore array of the micropore vibration thin sheet 102, and a reciprocating alternation of high and low pressures is presented in the region, which destroys the gas-liquid interface above and below the micropore vibration thin sheet 102.

Bubbles passing through the micropore array of the micropore vibration thin sheet 102 are scattered into a plurality of tiny bubbles by the elastic energy under the influence of the reciprocating alternation of high and low pressures caused by the high-frequency continuous oscillation of the micropore vibration thin sheet 102, and the initial bubbles of 30 to 200 μm are destroyed to generate tiny bubbles of 1 to 50 thereby forming micron-sized bubbles.

According to the apparatus provided by the above embodiment of the present disclosure, the transducing ring and the electrode sheet are fixed on the cylindrical body, and then the vibration energy of the transducing ring is transmitted to the micropore vibration thin sheet through the horn-shaped structure, thereby effectively driving the micropore vibration thin sheet to perform a high-frequency vibration. The thickness of the transducing ring is no longer limited by the structure of the vibration sheet to be driven, thereby increasing the voltage applied to the transducing ring and the working power of the apparatus, so that the amount of the generated microbubbles can be greatly improved.

Meanwhile, the outer side of the cylindrical body is insulated and sealed, thus sealing the transducing ring and the electrode sheet, and then the electrode line is led out by the steel pipe. Therefore, the waterproof performance of the whole apparatus can be improved, and the short circuit phenomenon will not occur when the ultrasonic microbubble generation apparatus is wholly placed in water, thus greatly ensuring the use safety of the apparatus.

Further, by designing the cavity at the horn mouth, the upper end of the cavity is fixedly connected with the micropore vibration thin sheet, the gas can pass through the bottom of the vibration sheet under an action of the pressure to form bubbles via the vent hole, thereby ensuring the sealing effect and the water-isolation effect of the gas, and reducing the required precision for the position of the micropore vibration thin sheet.

Figure 6:
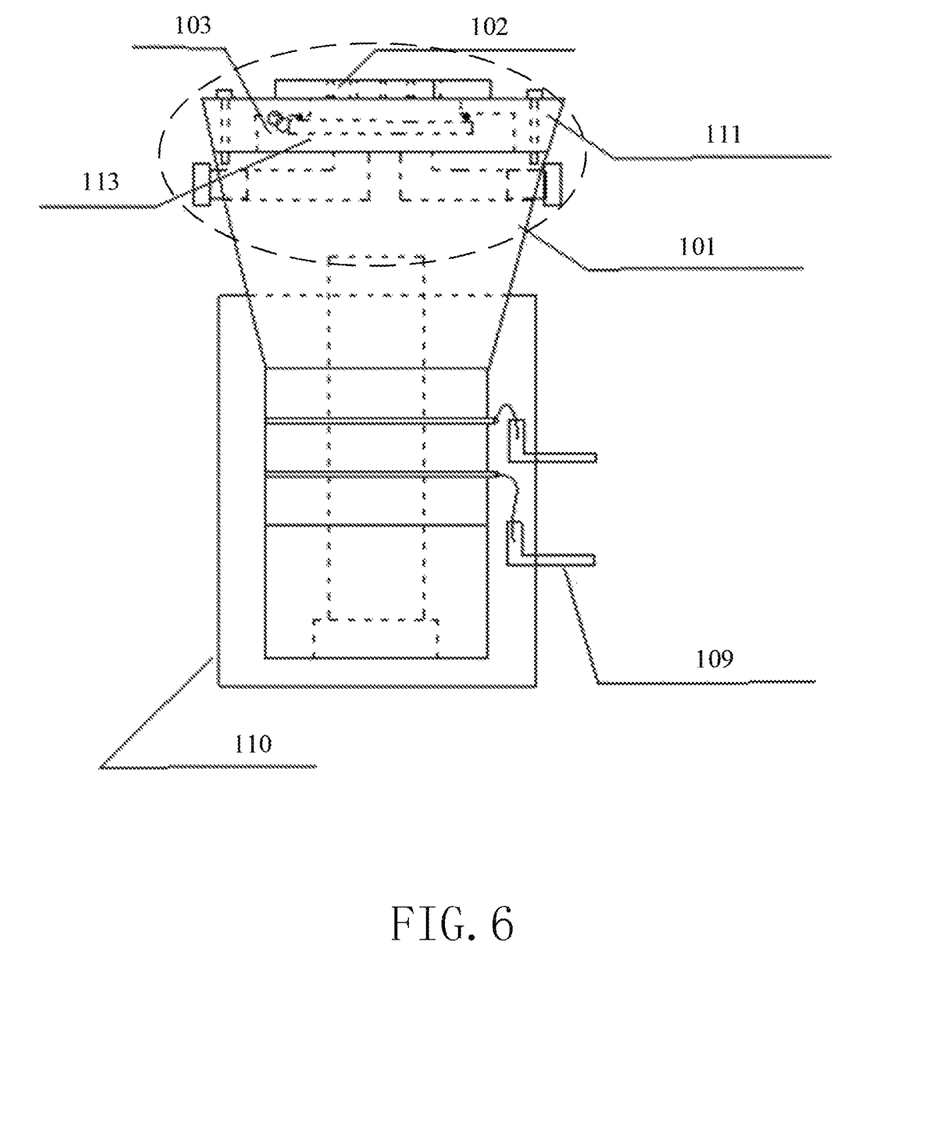
FIG. 6 is a schematic structural diagram of another ultrasonic microbubble generation apparatus, provided in the present disclosure.

FIG. 6 is a schematic structural diagram of another ultrasonic microbubble generation apparatus in the present disclosure. As illustrated in FIG. 6, a blocking cover sheet 113 is further provided in the cavity, which have a size larger than or equal to that of the upper opening of the cavity 103.

When the pressure of air delivered from the external increases suddenly, the gas enters the cavity, a pressure generated by a gas pressure difference is larger than a gravity of the blocking cover sheet, and the cover sheet seals the upper opening of the cavity upward to protect the micropore vibration thin sheet from being damaged by high-pressure gas. When the pressure is stable (e.g., a pressure difference between the gas and the outside water phase is less than 0.3 MPa), the blocking cover sheet is opened under an action of its own gravity to allow the gas to flow out of the micropore array. When a fluctuation of the gas pressure difference is high, the blocking cover sheet will be lifted by the gas again to seal the upper end. Therefore, by providing the blocking cover sheet in the cavity, the vibration thin sheet is protected by the blocking cover sheet under the condition of large pressure difference, and meanwhile, the sealing performance of the whole gas injection for the apparatus when the micropore vibration thin sheet fails can be improved.

Figure 7:
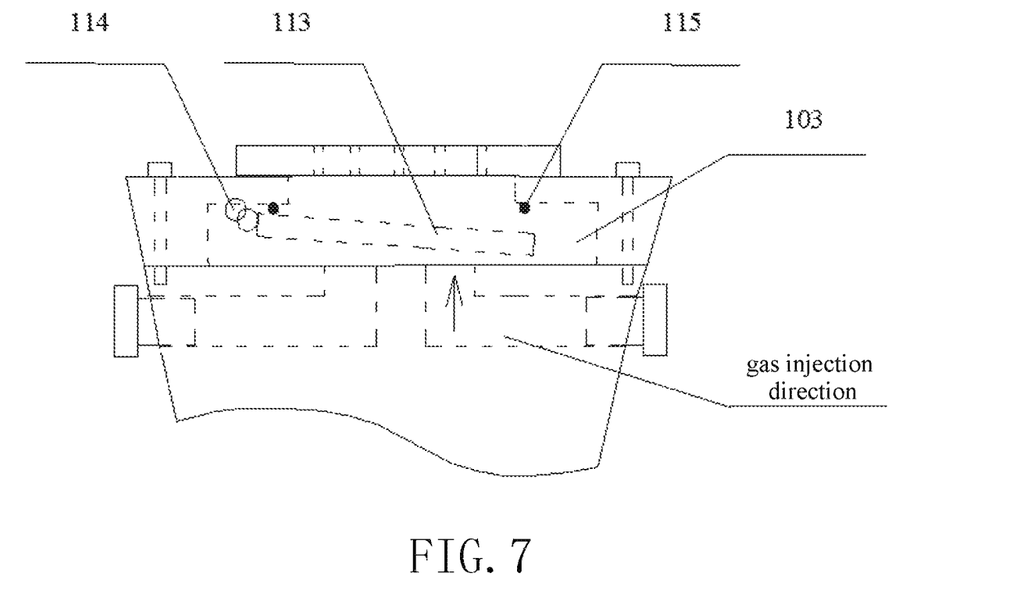
FIG. 7 is a partial enlarged view of another ultrasonic microbubble generation apparatus, provided in the present disclosure.

FIG. 7 illustrates an enlarged view of a structure in a dashed circle of FIG. 6. As illustrated in FIG. 7, in one embodiment of the present disclosure, the blocking cover sheet 113 and the inner wall of the cavity 103 can be connected by a hinge 114, so as to more accurately seal the upper opening of the cavity. Of course, during implementation, the blocking cover sheet 113 and the inner wall of the cavity 103 may be connected in other liftable way. Further, in one or more embodiments of the present disclosure, sealing rings 115 may be further provided on the inner walls of both sides of the cavity near the upper opening, thereby further improving the sealing effect of the blocking cover sheet to the upper opening of the cavity.

The apparatus provided by the one or more embodiments of the present disclosure has a good waterproof performance and can safely generate microbubbles in the water phases under the ground industrial condition and the wellbore condition. Meanwhile, the power of the ultrasonic microbubble generation apparatus can be greatly increased, thereby increasing the gas output quantity. In addition, when the gas pressure difference changes violently, the vibration thin sheet can be protected, and the sealing performance of the whole gas injection can be ensured when the vibration sheet fails.

Based on the apparatus provided in the one or more embodiments, an embodiment of the present disclosure further provides an ultrasonic microbubble generation method that is implemented using the apparatus, the method may comprise:

delivering gas with a preset pressure into a cavity of the ultrasonic microbubble generation apparatus, the gas in the cavity passing through a micropore array of a micropore vibration thin sheet under an action of the pressure to form bubbles;

connecting an electrode sheet of the ultrasonic microbubble generation apparatus with an ultrasonic oscillation controller through a connection wire led out by a steel pipe, to control oscillation of a transducing ring of the ultrasonic microbubble generation apparatus;

driving, by the oscillation of the transducing ring, the micropore vibration thin sheet of the ultrasonic microbubble generation apparatus to oscillate, such that bubbles passing through the micropore vibration thin sheet are scattered to obtain micron-sized bubbles.

In a specific embodiment, the ultrasonic microbubble generation apparatus may be wholly immersed in water; next, gas with a preset pressure may be delivered into a cavity in the upper portion of the ultrasonic microbubble generation apparatus through a pipeline, and the gas in the cavity can enter the water through a micropore array of the micropore vibration thin sheet under an action of pressure to form bubbles. Meanwhile, the ultrasonic oscillation controller may be started and electrically connected with an electrode sheet of the ultrasonic microbubble generation apparatus through a connection wire led out by a steel pipe. Under the control of the ultrasonic oscillation controller, the transducing ring of the ultrasonic microbubble generation apparatus starts to continuously oscillate.

The oscillation energy of the transducing ring of the ultrasonic microbubble generation apparatus is transmitted to the micropore vibration thin sheet along the horn-shaped conductor, and the micropore vibration thin sheet performs a high-frequency oscillation, thereby forming an abnormal pressure region in a certain space above and below the micropore array of the micropore vibration thin sheet, and a reciprocating alternation of high and low pressures is presented in the region, which destroys the gas-liquid interface above and below the micropore vibration thin sheet. Bubbles passing through the pores of the micropore array of the micropore vibration thin sheet are scattered into a plurality of tiny bubbles by the elastic energy under the influence of the reciprocating alternation of high and low pressures caused by the high-frequency continuous oscillation of the micropore vibration thin sheet, thereby forming micron-sized bubbles.

The method provided by the above embodiment of the present disclosure can safely and efficiently obtain microbubbles required by the industrial application. Of course, according to the description of the apparatus embodiments, the method may further comprise other method embodiments.

Figure 8:
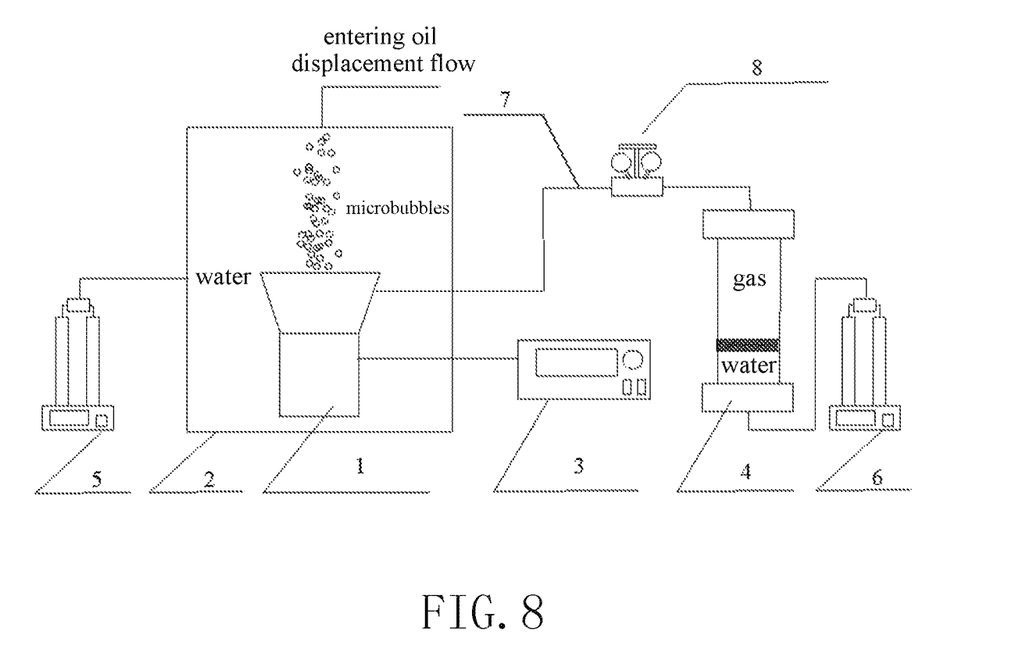
FIG. 8 is a schematic structural diagram of an ultrasonic microbubble generation system, provided in the present disclosure.

As illustrated in FIG. 8, an embodiment of the present disclosure further provides an ultrasonic microbubble generation system, which may comprise the ultrasonic microbubble generation apparatus 1 in any one or more embodiments as described above, an autoclave 2, an ultrasonic oscillation controller 3, a piston container 4, a first water injection pump 5, and a second water injection pump 6.

The first water injection pump 5 is connected with the autoclave 2 to fully inject water into the autoclave 2.

The ultrasonic microbubble generation apparatus 1 is provided in the autoclave 2.

The ultrasonic oscillation controller 3 is connected with the electrode sheet of the ultrasonic microbubble generation apparatus 1 through a connection wire, to control an oscillation of the transducing ring.

The second water injection pump 6 is connected with the piston container 4 to inject water thereinto.

Gas with a certain pressure is preset in the piston container 4, the piston container 4 injects the gas with a preset pressure into the cavity of the ultrasonic microbubble generation apparatus 1 through a gas delivery pipe 7, under a water injection pressure of the second water injection pump 6.

During implementation, the first water injection pump 5 may be connected with the autoclave 2 to inject water thereinto. The autoclave is full of water and internally provided with the ultrasonic microbubble generation apparatus 1. The autoclave has the function of pressure resistance and temperature resistance, and can simulate the working environment in wellbore of downhole, with a maximum resistible pressure of 50 MPa and a maximum resistible temperature of 100° C. For the convenience of observation, a visual autoclave with an observation window may also be used in the laboratory. The first water injection pump 5 may further supply energy to the autoclave 2 to maintain the pressure therein, and allow the generated water-gas dispersion system to enter an oil displacement flow through an outlet of the autoclave 2.

The ultrasonic oscillation controller 3 can be connected with the ultrasonic microbubble generation apparatus 1 that is wholly immersed in water; the electrode, wire and the like are consolidated by a rigid sealant; and the connection wire is led out by the steel pipe to be connected with the ultrasonic oscillation controller 3, so that a short circuit of the ultrasonic microbubble generation apparatus 1 is effectively avoided, and an effective vibration of the transducing ring can be ensured at the same time.

The second water injection pump 6 may be connected with the piston container 4 to inject water thereinto, and gas with a certain pressure is preset in the piston container 4. Under a water injection pressure of the second water injection pump 6, the gas in the piston container 4 is delivered into the cavity of the ultrasonic microbubble generation apparatus 1 through the gas delivery pipe 7.

In one embodiment of the present disclosure, the system may further comprise a gas pressure control valve 8 provided on the gas delivery pipe 7 to control a pressure of the gas delivered into the ultrasonic microbubble generation apparatus 1. The gas is pressurized in the piston container 4, adjusted to a design pressure by the gas pressure control valve 8, enters the cavity of the ultrasonic microbubble generation apparatus 1, and ejected through the pores of the micropore vibration thin sheet. When the gas flows out of the pores in the form of bubbles, the ultrasonic oscillation controller 3 is started, and the micropore vibration thin sheet vibrates rapidly to scatter the bubbles into micron-sized bubbles.

In some embodiments, for example, the first water injection pump 5 may be used to add water into the autoclave 2 to exhaust the internal air while increasing the temperature. When the temperature is stable at 50° C., the pressure in the autoclave 2 is slowly increased and stopped after reaching 20 MPa. Meanwhile, a back-pressure controller is provided at an outlet end of the autoclave 2 to make the pressure in the autoclave 2 be constant.

Gas with a certain pressure (e.g., 8 MPa) may be preset in the piston container 4, and when the container temperature is constant at 50° C., the gas pressure may be increased to 21 MPa by the second water injection pump 6. Through the gas pressure control valve 8, the pressure of the outflow gas is adjusted to 20.1 MPa. The gas is introduced into the ultrasonic microbubble generation apparatus 1, and the gas pressure value is adjusted so that the gas bubbles are produced at a designed gas volume.

The ultrasonic oscillation controller 3 is started to control an oscillation of the transducing ring, so as to drive the micropore vibration thin sheet to vibrate at a high speed. The pressure of the outflow gas is slightly adjusted by the gas pressure control valve 8, so that the microbubbles are produced at the designed gas volume. Then, the flow rate of the first water injection pump 5 may be adjusted, so that the microbubbles and the injected water enter the oil displacement flow at a designed ratio.

When the injected gas pressure difference suddenly increases (for example, designed to be 1 MPa), the blocking cover sheet in the ultrasonic microbubble generation apparatus blocks the perforated sheet, so that the gas does not flow until the gas pressure is stable, and then the blocking cover sheet is opened to continue to generate bubbles.

The system provided by the above one or more embodiments of the present disclosure effectively verifies the industrial practicability of the ultrasonic microbubble generation apparatus provided by the present disclosure by simulating the actual industrial application environment.

Based on the system provided by the above one or more embodiments, an embodiment of the present disclosure further provides an ultrasonic microbubble generation method implemented using the system, the method may comprise:

providing the ultrasonic microbubble generation apparatus in an autoclave, sealing the autoclave, and fully injecting water into the autoclave by a first water injection pump;

presetting gas with a certain pressure in the piston container, injecting water into the piston container by a second water injection pump, injecting gas with a preset pressure into a cavity of the ultrasonic microbubble generation apparatus by the piston container through a gas delivery pipe under the water injection pressure of the second water injection pump, and enabling the gas in the cavity to pass through a micropore vibration thin sheet of the ultrasonic microbubble generation apparatus under an action of pressure to form bubbles in water within the autoclave;

controlling, by an ultrasonic oscillation controller, an oscillation of the ultrasonic microbubble generation apparatus through a connection wire, to scatter bubbles passing through the micropore vibration thin sheet to form micron-sized bubbles in water within the autoclave.

The embodiments of the present disclosure are all described in a progressive manner, and the same or similar portions of the embodiments can refer to each other. Each embodiment lays an emphasis on its distinctions from other embodiments. In the description of the present disclosure, the description of reference terms "one embodiment", "some embodiments", "an example", "a specific example" or "some examples" and the like mean that the specific features, structures, materials, or characteristics described in conjunction with the embodiment(s) or example(s) are included in at least one embodiment or example of the present disclosure. In the present disclosure, the schematic expressions of the above terms do not necessarily aim at the same embodiment or example. Moreover, the specific features, structures, materials, or characteristics described may be combined in a suitable manner in any one or more embodiments or examples. In addition, a person skilled in the art may combine different embodiments or examples described in the present disclosure and features thereof if there is no contradiction. The drawings of the present disclosure are merely schematic and do not represent the actual structures of the various components.

Those described above are just examples of one or more embodiments of the present disclosure, rather than limitations thereto. For a person skilled in the art, one or more embodiments of the present disclosure may have various amendments or variations. Any amendment, equivalent substitution, improvement, etc. made under the spirit and principle of the present disclosure should fall within the scope of the claims.

What is claimed is:

1. An ultrasonic microbubble generation apparatus, comprising:
   a horn-shaped conductor including an upper horn-shaped body and a lower cylindrical body,
   the horn-shaped body is provided with a cavity having an upper opening, an upper end of the cavity is fixedly connected with a micropore vibration thin sheet, a micropore array of the micropore vibration thin sheet is corresponding to the upper opening of the cavity, and a side wall of the cavity is provided with a through hole for external gas to enter the cavity,
   the cylindrical body is provided with a transducing ring and an electrode sheet, an outer side of the cylindrical body is insulated and sealed, and a connection wire of the electrode sheet is led out by a steel pipe and connected with an external ultrasonic oscillation controller,
   wherein, the transducing ring and the electrode sheet are fixed on the cylindrical body under the horn-shaped body, and vibration energy of the transducing ring is transmitted to the micropore vibration thin sheet above the horn-shaped body through the horn-shaped structure.

2. The ultrasonic microbubble generation apparatus according to claim 1, wherein the cavity is further provided therein with a blocking cover sheet having a size larger than or equal to that of the upper opening of the cavity.

3. The ultrasonic microbubble generation apparatus according to claim 2, wherein one end of the blocking cover sheet and an inner wall of the cavity are connected by a hinge.

4. The ultrasonic microbubble generation apparatus according to claim 2, wherein sealing rings are further provided on the inner walls of both sides of the cavity near the upper opening, to improve a sealing performance of the blocking cover sheet to the upper opening.

5. The ultrasonic microbubble generation apparatus according to claim 1, wherein the horn-shaped body is of an integrally formed structure.

6. The ultrasonic microbubble generation apparatus according to claim 1, wherein the horn-shaped body comprises an upper end cover, which is a hollow annular structure, and the micropore vibration thin sheet is fixedly connected with an upper end of the upper end cover.

7. The ultrasonic microbubble generation apparatus according to claim 1, wherein the transducing ring has a thickness range from 3 mm to 8 mm.

8. The ultrasonic microbubble generation apparatus according to claim 1, wherein the horn-shaped body is provided therein with a pipeline communicated with the through hole on the cavity to delivery external gas into the cavity.

9. The ultrasonic microbubble generation apparatus according to claim 8, wherein the pipeline is symmetrically provided on two sides of the horn-shaped body.

10. An ultrasonic microbubble generation method based on the ultrasonic microbubble generation apparatus according to claim 1, comprising:
   delivering gas with a preset pressure into a cavity of the ultrasonic microbubble generation apparatus, the gas in the cavity passing through a micropore array of a micropore vibration thin sheet under an action of the pressure to form bubbles;
   connecting an electrode sheet of the ultrasonic microbubble generation apparatus with an ultrasonic oscillation controller through a connection wire led out by a steel pipe, to control oscillation of a transducing ring of the ultrasonic microbubble generation apparatus; and
   driving, by the oscillation of the transducing ring, the micropore vibration thin sheet of the ultrasonic microbubble generation apparatus to oscillate, to scatter bubbles passing through the micropore vibration thin sheet to obtain micron-sized bubbles.

11. An ultrasonic microbubble generation system, comprising the ultrasonic microbubble generation apparatus according to claim 1, an autoclave, an ultrasonic oscillation controller, a piston container, a first water injection pump, and a second water injection pump,
   the first water injection pump is connected with the autoclave to fully inject water into the autoclave,
   the ultrasonic microbubble generation apparatus is provided in the autoclave,
   the ultrasonic oscillation controller is connected with an electrode sheet of the ultrasonic microbubble generation apparatus through a connection wire, to control an oscillation of a transducing ring,
   the second water injection pump is connected with the piston container to inject water thereinto, and
   gas with a certain pressure is preset in the piston container, the piston container inject the gas with a preset pressure into the cavity of the ultrasonic microbubble generation apparatus through a gas delivery pipe, under a water injection pressure of the second water injection pump.

12. The ultrasonic microbubble generation system according to claim 11, further comprising a gas pressure control valve provided on the gas delivery pipe to control a pressure of the gas delivered into the ultrasonic microbubble generation apparatus.

13. An ultrasonic microbubble generation method based on the ultrasonic microbubble generation system according to claim 11, comprising:
   providing a ultrasonic microbubble generation apparatus in an autoclave, sealing the autoclave, and fully injecting water into the autoclave by a first water injection pump;
   presetting gas with a certain pressure in a piston container, injecting water into the piston container by a second water injection pump, injecting gas with a preset pressure into a cavity of the ultrasonic microbubble generation apparatus by the piston container through a gas delivery pipe under a water injection pressure of the second water injection pump, and enabling the gas in the cavity to pass through a micropore vibration thin sheet of the ultrasonic microbubble generation apparatus under an action of pressure to form bubbles in water in the autoclave;

controlling, by an ultrasonic oscillation controller, an oscillation of the ultrasonic microbubble generation apparatus through a connection wire, to scatter bubbles passing through the micropore vibration thin sheet to form micron-sized bubbles in water in the autoclave.

\* \* \* \* \*